J. G. STEWART.
WELDED JOINT FOR STEEL AND IRON PIPES AND TUBES.
APPLICATION FILED NOV. 22, 1912.
1,103,630.
Patented July 14, 1914.
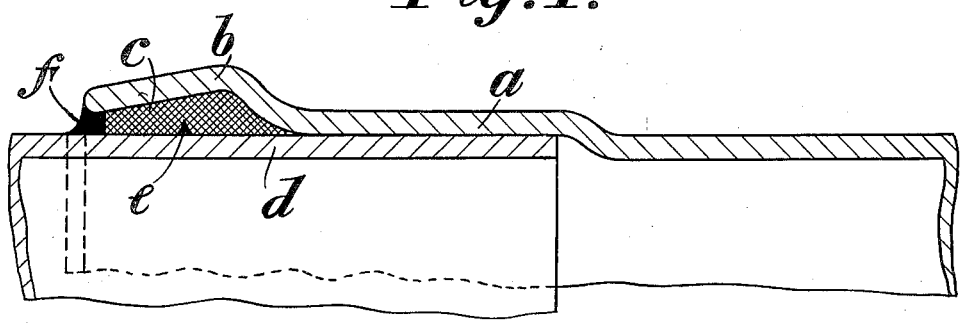
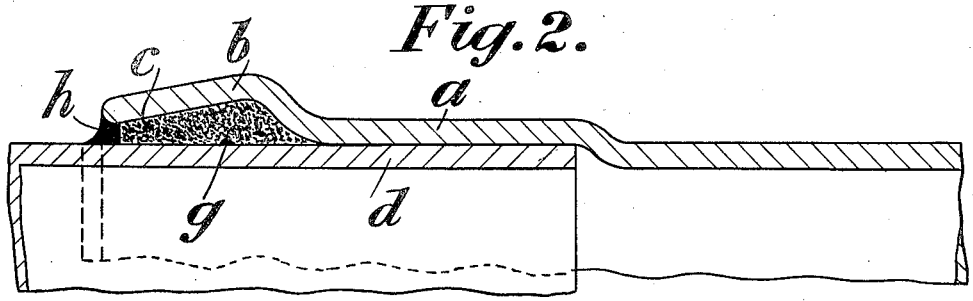
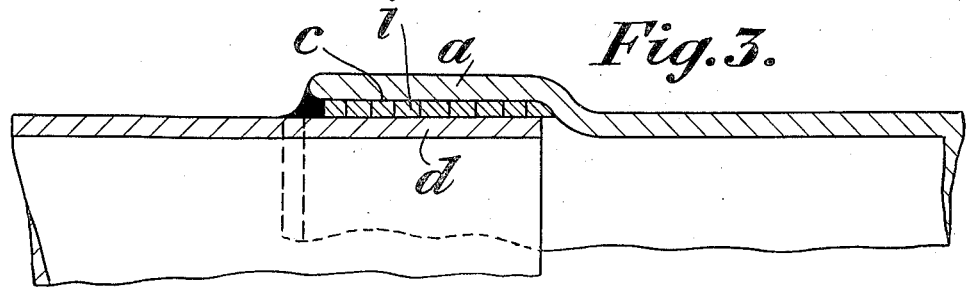

UNITED STATES PATENT OFFICE.

JOHN GRAHAM STEWART, OF COATBRIDGE, SCOTLAND, ASSIGNOR TO STEWARTS & LLOYDS, LIMITED, OF COATBRIDGE, SCOTLAND.

WELDED JOINT FOR STEEL AND IRON PIPES AND TUBES.

1,103,630.  Specification of Letters Patent.  Patented July 14, 1914.

Application filed November 22, 1912. Serial No. 732,951.

*To all whom it may concern:*

Be it known that I, JOHN GRAHAM STEWART, a subject of the King of Great Britain, residing at Coatbridge, Lanarkshire, Scotland, have invented certain new and useful Improvements in Welded Joints for Steel and Iron Pipes and Tubes, of which the following is a specification.

At present it is usual, when jointing iron or steel pipes and tubes by autogenous welding, to have the sections or lengths of the pipe lines slightly scarfed or beveled at the ends and to butt these scarfed ends together, the jointing metal and the pipe ends being then brought to a welding heat by means of an oxy-acetylene or other flame. Such butt welded joints are apt to break readily under bending strains and strains arising from expansion and contraction and other causes and, in the case of gas and other mains, laid in roadways, also under the stresses produced by the passage over them of heavy motor vehicles. Under my invention I make the joint for the iron or steel pipes or tubes with a spigot and faucet connection of sufficient length and tightness to prevent transverse strains acting on the weld which latter is effected at the end of the faucet and can be done in a thoroughly reliable manner and without danger to the operator. A space is left between the spigot and faucet and this space is packed, either wholly or partially with metal turnings, filings or pieces or metal wire or rings, care being taken that the metal used is of the same nature as that of the pipes or tubes being jointed. The packing is inserted with sufficient tightness to form a rigid joint so as to take any transverse strain off the actual weld. The weld is effected at the end of the faucet by simply directing the oxy-acetylene or other flame on to the metal turnings, filings, or pieces, as the case may be, so as to reduce a part or the whole thereof to a molten condition and, at the same time, the faucet and spigot are heated by the flame to a sufficient extent to effect an autogenous weld between the faucet and the spigot with the aid of the additional metal constituted by the said turnings, filings, or pieces. The oxyacetylene flame is directed parallel or substantially parallel with the surface of the spigot and into the annular space left between the spigot and faucet and plays against the metal packing and the end of the faucet and the adjacent surface of the spigot.

In order that the invention may be clearly understood I have hereunto appended, simply by way of illustration or example, a drawing which shows, in section, different forms of spigot and faucet joints packed and welded in accordance with my invention.

Figure 1 shows a spigot and faucet joint in which the faucet is made with an enlargement for the reception of the metallic packing. Fig. 2 shows a similar joint but packed with refractory material. Fig. 3 shows a joint in which rings are used as packing.

In Figs. 1 and 2 the faucet $a$ is made with an enlargement $b$ at its end, a packing space $c$ being left between the enlarged part and the spigot $d$. The space $c$ may, as shown at Fig. 1, be tightly packed with metal turnings, filings, or pieces $e$ and, when effecting the weld at the end of the faucet, the exterior portion $f$ of the packing is brought to the necessary welding heat by the application of an oxy-acetylene or other flame.

In Fig. 2 the space $c$ is shown as tightly packed with refractory material $g$ the autogenous weld being effected, at the end of the faucet, by the aid of additional metal $h$ of the same nature as the piping. Of course the space $c$ may be merely packed with refractory material at its interior and at its exterior be packed with a suitable metal by the aid of which the autogenous weld can be effected.

In Fig. 3 a plain spigot and faucet joint is shown the space $c$ between the spigot and faucet being packed with rings $i$ all of which may be metal of the same nature as the piping or only the outer one. In this case the outer ring serves for the uniting metal of the autogenous weld.

The invention can, of course, be applied to any form of spigot and faucet pipe joint wherein a suitable space is left or provided for the reception of the packing.

The re-inforcement to the spigot $d$ provided by the tightly packed faucet $a$, $b$, gives sufficient strength to the joint to resist transverse stresses and prevent strains produced thereby acting on the weld which latter insures fluid tightness. By using a metallic packing suitable for forming the weld, the latter can be effected without the use by the operator of the usual additional metal.

Having now fully described my invention what I claim and desire to secure by Letters Patent is:—

1. A pipe joint comprising, in combination, a metal tube, a second metal tube having an enlarged faucet part surrounding the end of the said first tube and a metal of the same nature as the tubing packed tightly into the annular space between the two tubes and welded at the end of the faucet to the adjacent surfaces of the tubes.

2. A pipe joint comprising, in combination, a metal tube, a second metal tube having an enlarged faucet part embracing the end of the said first tube and metal turnings of the same nature as the tubing packed into the space between the tubes and welded to the adjacent surfaces thereof.

3. A pipe joint comprising, in combination, a metal spigot tube, a second metal tube having a faucet part tightly embracing the end of the said spigot tube said faucet being enlarged at its end and metal packing inserted tightly into the enlargement, the end of the faucet part being weld-connected to the spigot by the aid of a portion of the metallic packing.

4. A pipe joint comprising, in combination, a metal spigot tube, a second metal tube having a faucet part tightly embracing the end of the said spigot tube said faucet being enlarged at its end, packing of the same material as the tubes inserted in the enlargement, and a weld connection made between the spigot and faucet with the aid of said packing.

In testimony whereof I affix my signature in presence of two witnesses.

JOHN GRAHAM STEWART.

Witnesses:
WILLIAM GALL,
LEO H. FREEMAN.